United States Patent
Sun

(10) Patent No.: US 6,859,566 B2
(45) Date of Patent: Feb. 22, 2005

(54) METHOD OF ANALYZING FRINGE IMAGE HAVING SEPARATE REGIONS

(75) Inventor: Ping Sun, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 640 days.

(21) Appl. No.: 09/998,646

(22) Filed: Dec. 3, 2001

(65) Prior Publication Data

US 2002/0076104 A1 Jun. 20, 2002

(30) Foreign Application Priority Data

Dec. 18, 2000 (JP) .......................................... 2000-383264

(51) Int. Cl.[7] .............................. G06K 9/36; G06K 9/46
(52) U.S. Cl. ..................................... 382/283; 382/237
(58) Field of Search ................................ 382/173, 175, 382/199, 232, 237, 254, 261, 263, 264, 266, 270, 275, 276, 283; 356/468, 503, 509, 521

(56) References Cited

U.S. PATENT DOCUMENTS

| | | | | |
|---|---|---|---|---|
| 4,676,643 A | * | 6/1987 | Vescial ........................ 356/468 |
| 4,880,308 A | * | 11/1989 | Shirasu ........................ 356/401 |
| 5,724,137 A | * | 3/1998 | Tronolone et al. .......... 356/521 |
| 5,808,742 A | * | 9/1998 | Everett et al. .............. 356/509 |
| 6,055,340 A | * | 4/2000 | Nagao ......................... 382/261 |
| 6,088,103 A | * | 7/2000 | Everett et al. .............. 356/503 |
| 6,269,208 B1 | * | 7/2001 | Bhatia et al. ................. 385/37 |
| 6,282,309 B1 | * | 8/2001 | Emery ........................ 382/145 |
| 6,300,955 B1 | * | 10/2001 | Zamir ......................... 382/283 |
| 6,373,992 B1 | * | 4/2002 | Nagao ......................... 382/266 |

OTHER PUBLICATIONS

"Applied Optics—Introduction to Optical Measurement," pp. 185–195, Maruzen Co., Ltd.

Creath, Katherine, "Phase–Measurement Interferometry Techniques," *Progress in Optics*, vol. XXVI, edited by E. Wolf, 1988, pp. 349–393, Elsevier Science Publishers B.V.

Takajo, Hiroaki et al., "Least–Squares Phase Estimation from the Phase Difference," *Journal of the Optical Society of American A*, Mar. 1988, pp. 416–425, vol. 5, No. 3.

* cited by examiner

*Primary Examiner*—Andrew W. Johns
*Assistant Examiner*—Amir Alavi
(74) *Attorney, Agent, or Firm*—Ronald R. Snider; Snider and Associates

(57) ABSTRACT

In a method of analyzing a fringe image, a mask is provided to a gap for separating a plurality of fringe image regions from each other, a virtual fringe distribution is once rendered to the mask region so as to yield a single fringe image, a fringe analysis is carried out thereafter, and then data of the mask region is deleted, so that the separated independent regions have a phase relationship therebetween, whereby information of the object to be observed is obtained at a high speed.

10 Claims, 16 Drawing Sheets

US 6,859,566 B2

METHOD OF ANALYZING FRINGE IMAGE HAVING SEPARATE REGIONS

RELATED APPLICATIONS

This application claims the priority of Japanese Patent Application No. 2000-383264 filed on Dec. 18, 2000, which is incorporated herein by reference.

BACKGROUND OF THE INVENTION

1. Field of the Invention

The present invention relates to a method of analyzing a fringe image having separate regions. In this method, numerical data are obtained by observing fringe images such as interference fringes, moiré fringes, photoelastic fringes, and Schlieren fringes in measurement of surface forms and transmitted wavefront measurement in which forms are observed as being divided by structures, structures of objects themselves, structures of observing means, or the like, such as surface form measurement of objects having groove-like structures in relatively smooth surface forms like chuck discs, whetstones for grinding and polishing, clutch plates for automobiles, and grooved optical prisms; face measurement by use of an optical wavefront through a crisscross scale, a viewer window with a reinforcement, and moiré gratings with reference lines; and the like.

2. Description of the Prior Art

Along with the advance of industrial technology, the demand for accurately measuring objects has been increasing. Also, the product control by means of computers has advanced, whereby results of measurement of objects have been required more and more in the form of numerical values.

Measurement means includes point measurement method in which the whole is measured as an assembly of point measurements, and pattern measurement method in which the whole is measured in terms of analog information whereas the numerical value of each point is determined by image analysis.

The point measurement method is advantageous in that results are obtained as numeric values per se at the time of measurement, but it takes time if the number of measurement points increases, thereby inevitably becoming susceptible to disturbance during the measurement.

On the other hand, though the measurement time is short in the pattern measurement method, the results obtained as analog information must be converted into numerical information.

Hence, there have been attempts to carry out efficient inspection/measurement by combining the point measurement and pattern measurement together in the industry. For an optical lens, by way of example, the point measurement is employed for inspecting its center thickness and outer diameter, whereas the pattern measurement is employed when it is necessary to finely inspect the whole surface as in surface form inspection and material density inspection.

A typical example of the pattern measurement is fringe image measurement represented by interference fringes and moiré fringes. The fringe analysis method in which the numerical information of each point is determined from a fringe image has become easy to carry out thanks to computers, the increase in their memory in particular.

Typical examples of fringe analysis method include the fringe-thinning method described in "Applied Optics— Introduction to Optical Measurement," pp. 185–195, published by Maruzen Co., Ltd., and the phase shift fringe analysis method (also known as fringe scanning method or phase scanning method) described in "PHASE-MEASUREMENT INTERFEROMETRY TECHNIQUES," PROGRESS IN OPTICS, Vol. XXXVI (1988), pp. 349–393.

The above-mentioned fringe-thinning method thins a fringe having a gradation in a fringe image by binary-coding at its peak position, calculates the ordinal number of each point in the fringe image with reference to its surrounding thinned fringe patterns, and multiplies it by a sensitivity per fringe stripe, thereby determining numerical values of all the points of the fringe image.

The phase-shift fringe analysis method measures changes in brightness in all the points of the fringe image in the process of scanning one stripe of the fringe pattern, and calculates the phase of each point from its results, thereby determining numerical values of all the points of the fringe image.

In each of the above-mentioned fringe analysis methods, analyzable patterns are limited to those which are at least partly continuous, whereby fringe patterns occurring in a plurality of regions which are completely separated from each other by grooves and the like have been hard to analyze as a total of the plurality of regions even though the individual regions can discretely be taken out and analyzed.

On the other hand, a method in which a phase calculation of each independent region is carried out and then the respective phases of separate regions are fitted in terms of least squares so as to provide each separate region with a phase relationship is described in Hiroaki Takajo and Tohru Takahashi, "Least-squares phase estimation from the phase difference," J.O.S.A. A/Vol. 5, No. 3, March 1988, pp. 416–425.

The above-mentioned technique of fitting a wavefront in terms of least squares is quite effective against dust and dirt, vibrations, turbulence in air, and the like at the time of phase unwrapping as in amplitude-maximizing method, an execution condition for enabling the phase unwrapping will additionally be necessary if there is an independent start point for connecting phases because of the fact that separate regions exist. Also, it is necessary for this method to individually look for start points for connecting phases with respect to separate regions, so as to unwrap each separate region, estimate a phase of the whole by least squares thereafter, and then determine the phase of each separate region after arranging the independent start point for connecting phases into a phase difference of an integer multiple of $2\pi$, thereby necessitating a quite complicated calculation and taking a long analysis time.

Meanwhile, in an inspection area separated into a plurality of independent regions by suction grooves as in a surface of a chuck disc for chucking a wafer in the making of IC, there has been a strong demand in the industry for measuring with a high accuracy not only the respective surface forms of individual independent regions but also the surface form of the whole constituted by these independent regions. In mass-products such as grooved optical prisms, in particular, there has been a strong demand for shortening the measurement time since it greatly affects their cost and quantity of production.

SUMMARY OF THE INVENTION

In view of the foregoing circumstances, it is an object of the present invention to provide a method of analyzing a fringe image having separate regions, which can impart a mutual phase relationship to a plurality of independent inspection regions without yielding the problem of phase-connecting start point, thereby making it possible to measure not only the respective surface forms of the individual independent regions but also the surface form of the whole constituted by the independent regions at a high accuracy and a high speed.

For overcoming such a problem, the present invention provides a method of analyzing a fringe image having separate regions, in which a fringe image carrying information of an object to be observed is analyzed so as to obtain the information of the object, the fringe image being constituted as an assembly of a plurality of separate independent fringe image regions, the method comprising the steps of:

providing a mask to a gap separating the plurality of fringe image regions from each other; rendering a virtual fringe distribution to thus obtained mask region so as to yield a single continuous fringe image region; analyzing the whole surface of thus obtained single fringe image region by use of a predetermined fringe analysis method; and deleting information of the mask region from information of the single fringe image region obtained by the whole surface analysis, so as to yield desirable information of the fringe image, thereby making it possible to analyze the fringe image having separate regions.

In the method of the present invention, the mask corresponding to a gap for separating the plurality of fringe image regions from each other may be formed by rendering a threshold to a modulation of the fringe image captured by imaging means, binary-coding the fringe image according to the threshold, preparing a blurred image by averaging each pixel of the binary-coded image and a pixel in the vicinity thereof, and setting a mask threshold thereafter according to a brightness of the blurred image.

The fringe image may be one obtained by a lightwave interferometer.

The fringe image may be one obtained by a moiré profilometer.

The object to be observed may be a measurement member having a slit per predetermined pitch.

The processing of the blurred image may be omitted when the fringe image has a favorable contrast.

The processing for providing the mask may manually be carried out while observing the fringe image.

The threshold in the modulation of the fringe image may be set by a distribution graph of modulation prepared according to maximum and minimum values of the modulation of fringe image determined over the whole surface of means for displaying the fringe image, and a modulation value yielding the lowest modulation distribution while being located in the vicinity of zero in a differentiation graph determining a change ratio in the distribution graph of the modulation.

A boundary position of the mask provided so as to correspond to the gap for separating the plurality of image regions from each other may be determined by binary-coding the blurred image with the mask threshold, and then carrying out partial differentiation of a brightness of each point while scanning the whole surface of means for displaying thus binary-coded image in a scanning direction and/or a direction orthogonal to the scanning direction, so as to determine a point of change in brightness.

The virtual fringe distribution may be rendered to the gap for separating the plurality of fringe image regions from each other by providing the mask to the fringe image and determining a brightness of the fringe image at a boundary position of the mask and another boundary position opposite thereto in a scanning direction over the whole surface, determining a gradient of brightness between each pair of boundary positions from thus determined brightness, and providing a brightness having the gradient distribution between boundary positions corresponding to each pair of the masked boundary positions for complement.

In the method of analyzing a fringe image having separate regions in accordance with the present invention, a virtual fringe distribution is provided to a gap separating the plurality of fringe image regions from each other so as to yield a continuous fringe image region, which is analyzed as a single fringe image region, and then data of the region provided with the virtual fringe distribution is deleted. Therefore, a mutual relationship is imparted to a plurality of independent inspection regions, whereby not only the respective surface forms of the individual independent regions but also the surface form of the whole constituted by the independent regions can be measured with a high accuracy at a high speed.

In the case where a mask threshold is set by the brightness of a blurred mask prepared according to a threshold provided in the modulation of the fringe image, a smooth mask can automatically be prepared in the region for providing the virtual distribution even when the region has a complicated form or a part having an unfavorable image contrast.

In the case where the modulation threshold of the fringe image is determined from the modulation distribution determined over the whole surface of means for displaying the fringe image and a change ratio distribution thereof, the threshold can be determined automatically.

In the case where the blurred image prepared after binary-coding with the mask threshold is scanned over the whole surface so as to determine a point in change of brightness, a boundary of the mask corresponding to the region to provide the virtual fringe distribution can easily be determined.

In the case where the brightness of the fringe image is measured over the whole surface at boundary positions holding therebetween the mask corresponding to the gap for separating a plurality of fringe image regions from each other, and such a brightness distribution that the brightness between opposing two boundary positions changes smoothly is provided between the boundary positions, a mutual relationship can be imparted to a plurality of independent inspection areas.

DESCRIPTION OF THE PREFERRED EMBODIMENTS

Figure 1:
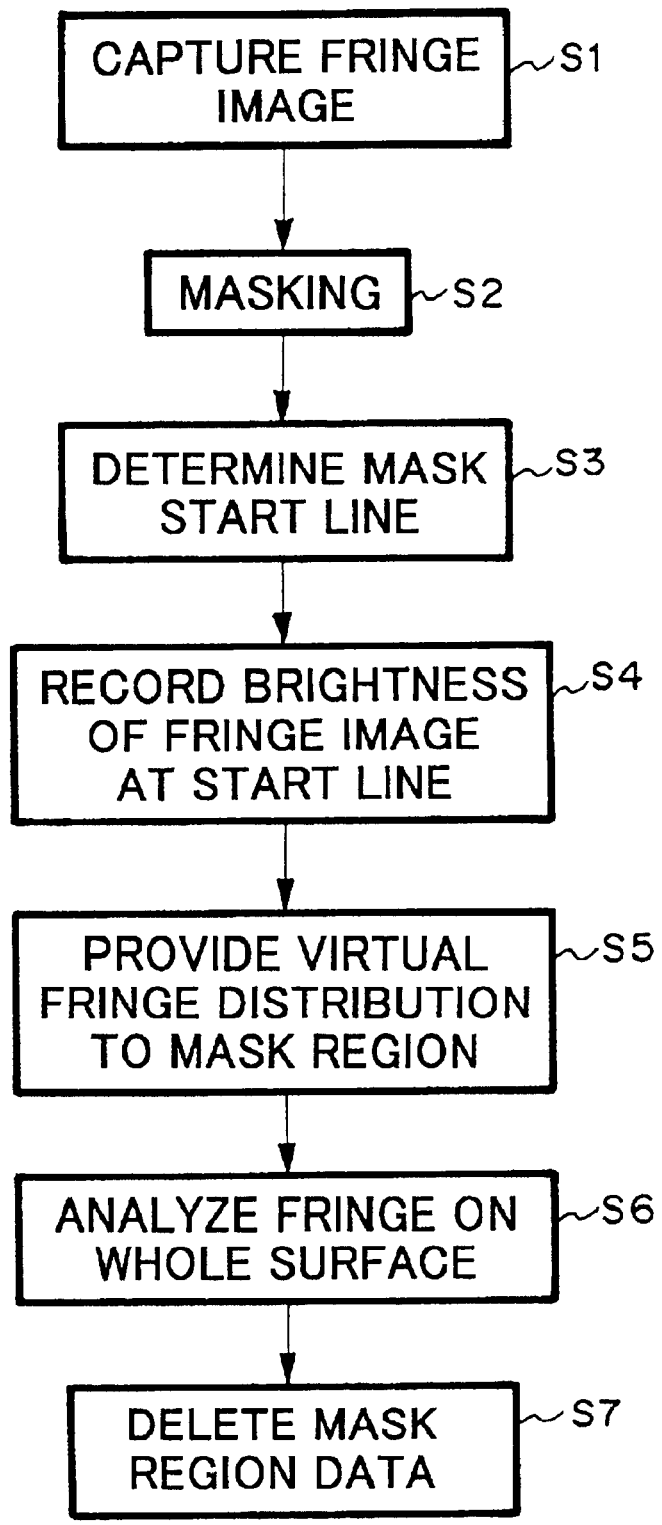
FIG. 1 is a flowchart showing the fringe image analyzing method in accordance with a first example of the present invention.

In the following, the fringe image analyzing method in accordance with an embodiment of the present invention will be explained with reference to drawings. Here, six examples shown in their corresponding flowcharts will be explained successively. FIG. 1 is a flowchart showing a first example of the present invention, which is an example of measurement of a reflecting object having a gap at a center part thereof by use of an interferometer.

Figure 2:
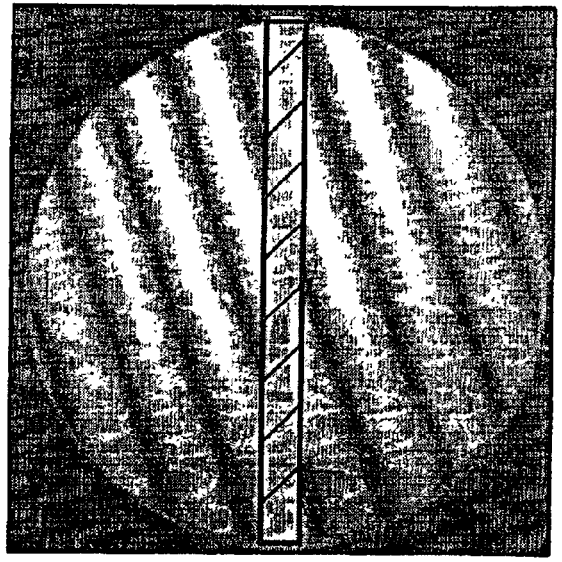
FIG. 2 is a view showing a state where a mask is superposed on an interference fringe image in the first example.
Figure 3:
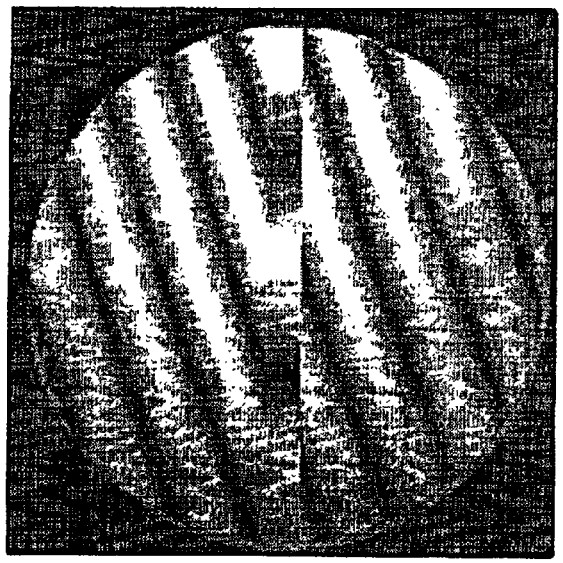
FIG. 3 is a view showing how to provide a virtual fringe to a mask region of the interference fringe image in the first example.
Figure 4:
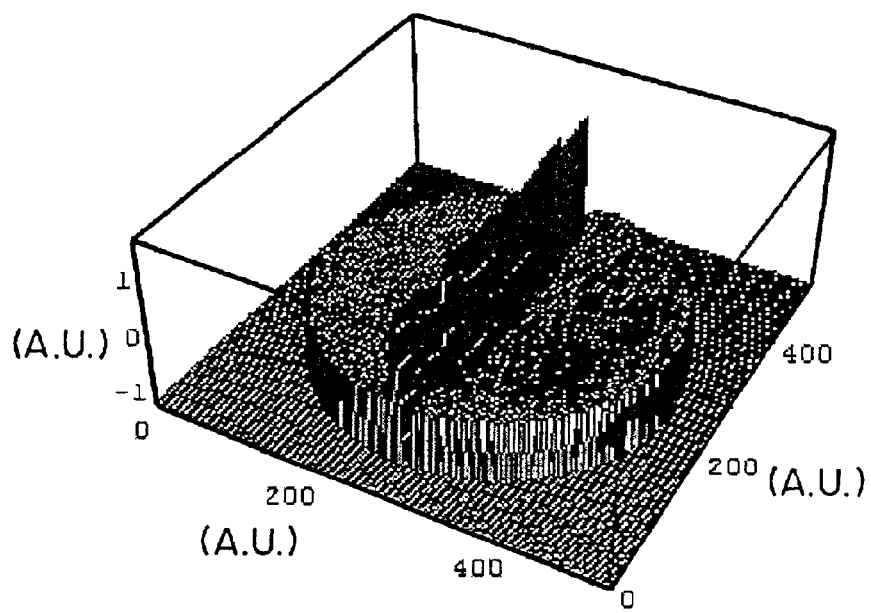
FIG. 4 is a view showing results obtained when the fringe provided with the virtual fringe is totally analyzed in the first example.
Figure 5:
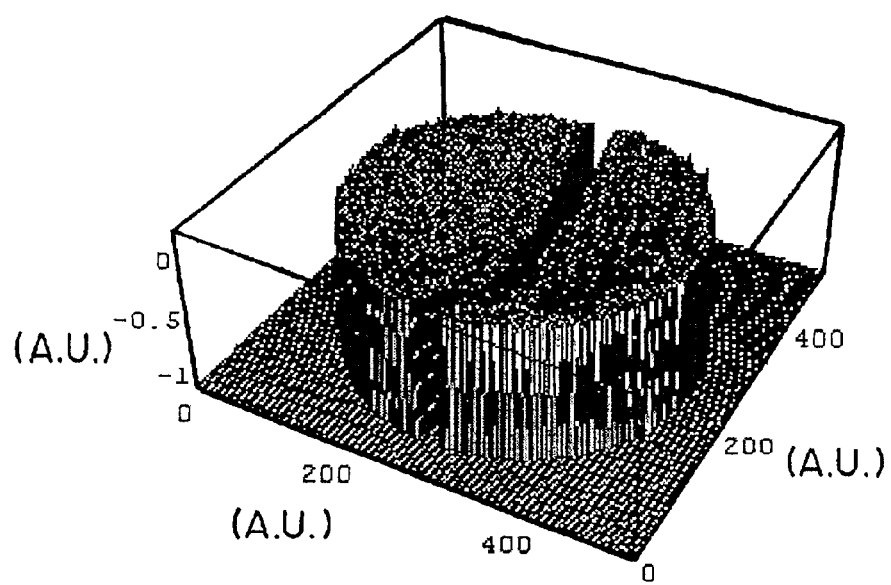
FIG. 5 is a view showing results obtained when the mask region is deleted from the results shown in FIG. 4.

First, an interference fringe image obtained by use of the interferometer is stored into a memory (S1). Subsequently, as shown in FIG. 2, a rectangular mask is manually drawn so as to be superposed onto the above-mentioned image at a part corresponding to a gap (S2), and coordinates of a start line of the mask are determined (S3). Then, the brightness of the fringe image at the start line is recorded (S4), and a virtual fringe having a brightness on a par with that at the start line is imparted to the mask region (S5). The results are shown in FIG. 3. Subsequently, the fringe provided with the virtual fringe is analyzed over the whole surface (S6). The results are shown in FIG. 4. Thereafter, the virtual fringe form provided to the mask region is deleted (S7). The results are shown in FIG. 5.

Figure 6:
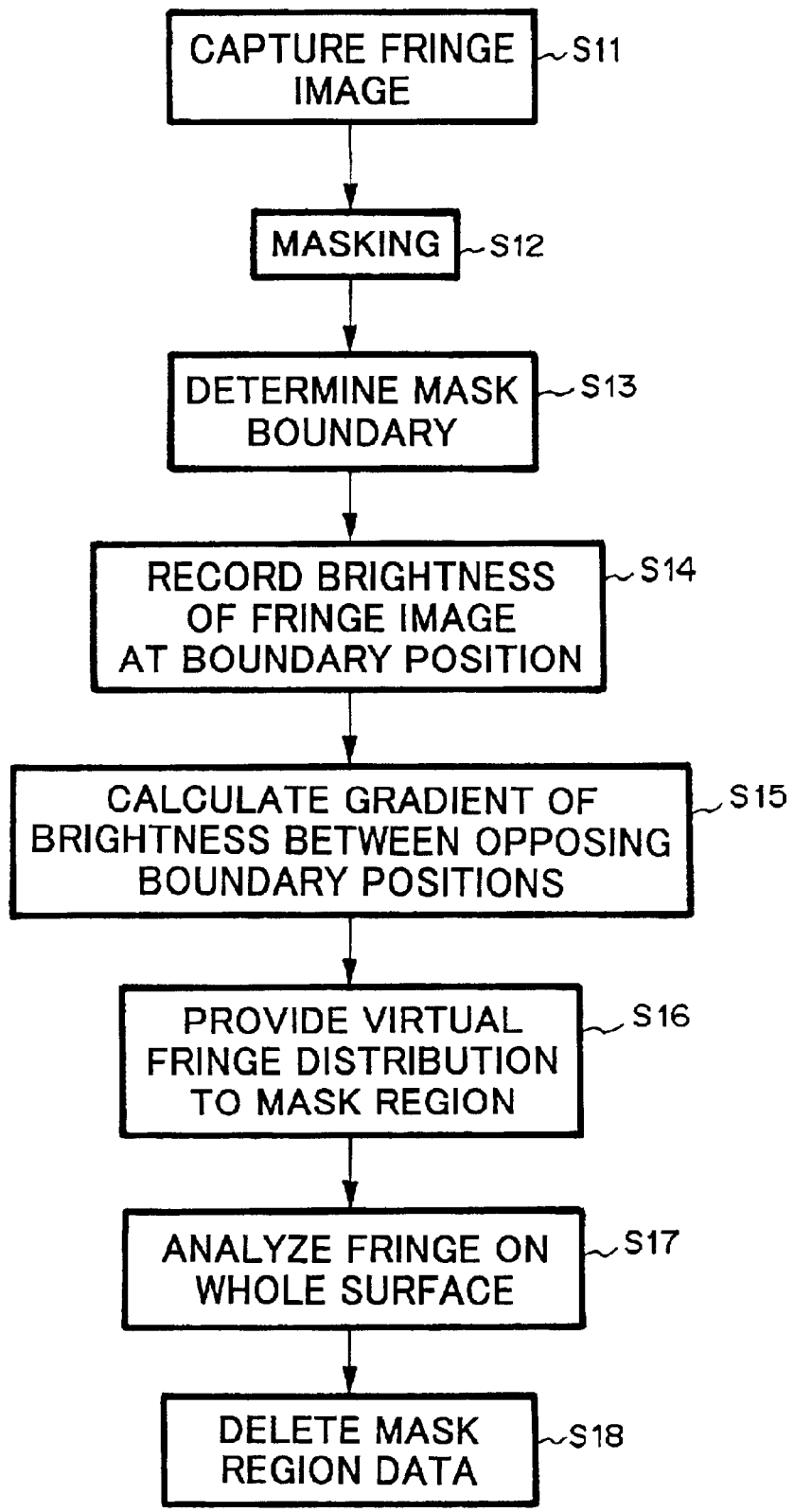
FIG. 6 is a flowchart showing the fringe image analyzing method in accordance with a second example of the present invention.
Figure 7:
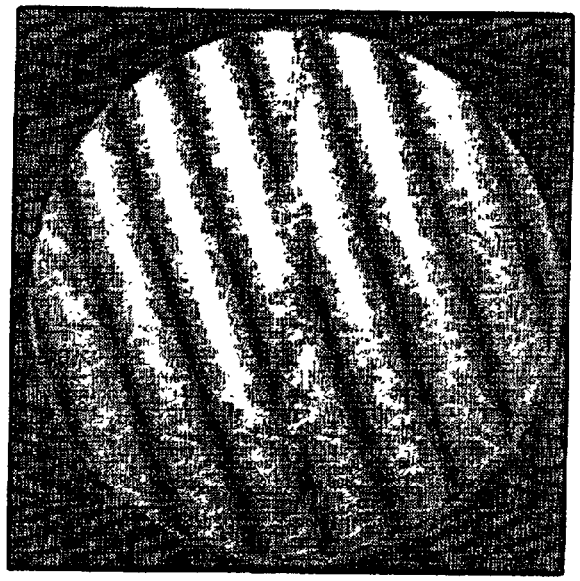
FIG. 7 is a view showing how to provide a virtual fringe to a mask region of an interference fringe image in the second example.
Figure 8:
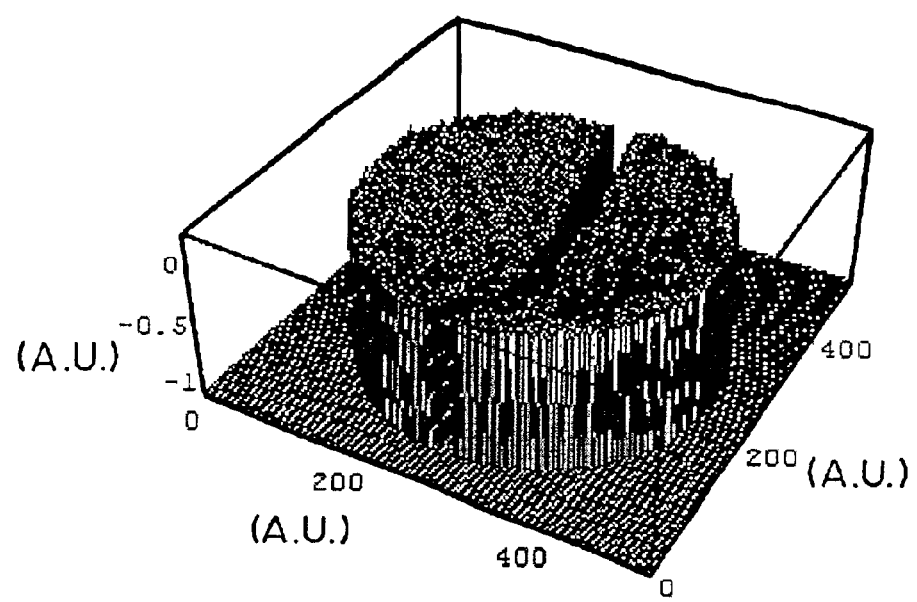
FIG. 8 is a view showing results obtained when the mask region is deleted from the results shown in FIG. 7.

FIG. 6 is a flowchart showing a second example of the present invention, which is an example of measurement of a reflecting object having a gap at a center part thereof by use of an interferometer as in the first example. To begin with, as in the first example, an interference fringe image is stored into a memory (S11), and masking is carried out (S12). Thereafter, in this example, a mask boundary is determined (S13). Subsequently, the brightness of the fringe image at a boundary position of the mask is recorded (S14), and the gradient concerning brightness between opposing boundary positions is calculated (S15). Using thus calculated gradient concerning brightness, a virtual fringe is imparted to the mask region (S16). The results are shown in FIG. 7. Thereafter, as in the first example, the fringe provided with the virtual fringe is analyzed over the whole surface (S17), and the virtual fringe form provided to the mask region is deleted (S18). The results are shown in FIG. 8.

Figure 9:
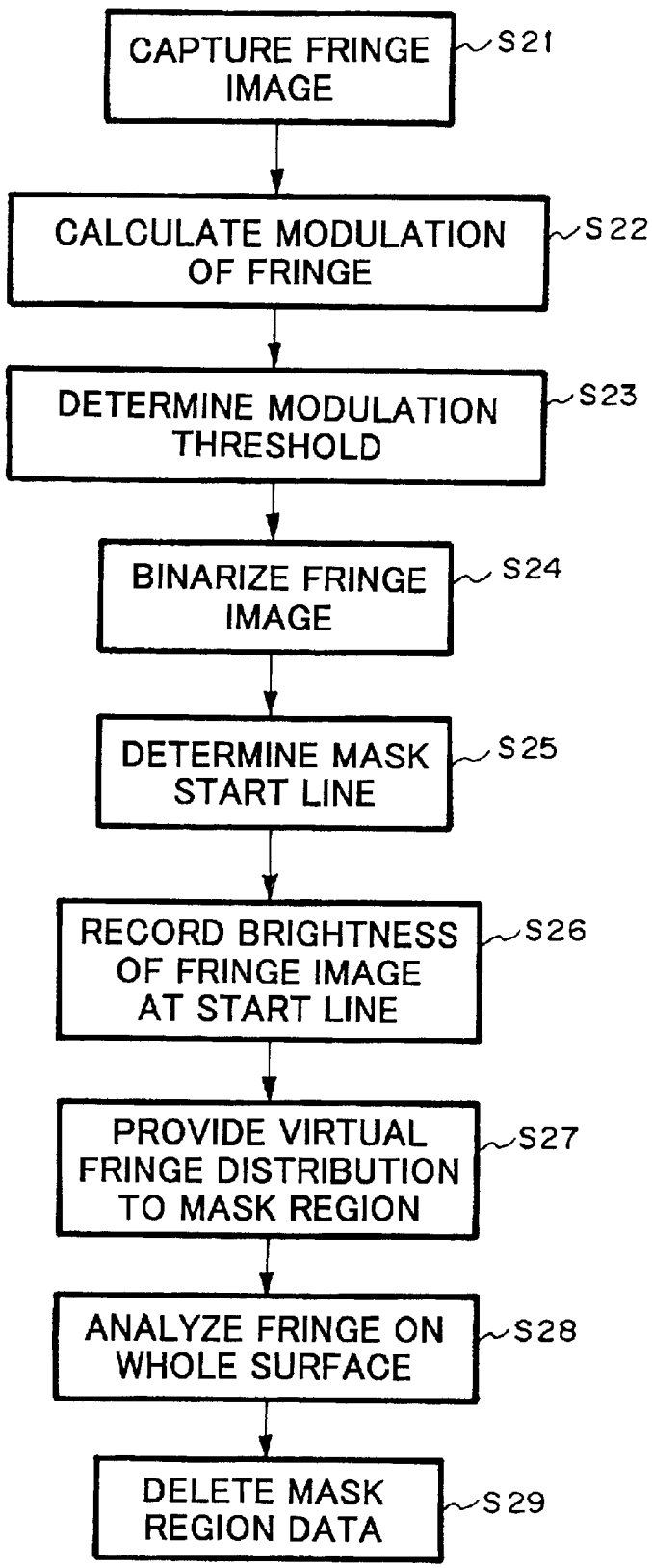
FIG. 9 is a flowchart showing the fringe image analyzing method in accordance with a third example of the present invention.
Figure 10:
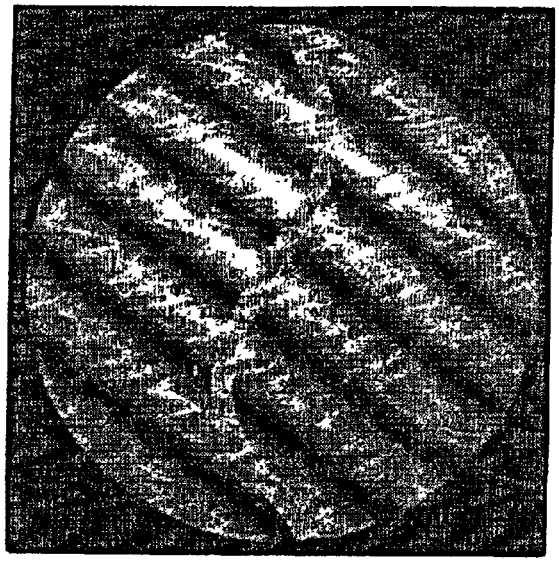
FIG. 10 is a view for explaining a modulation mask in the third example.
Figure 11:
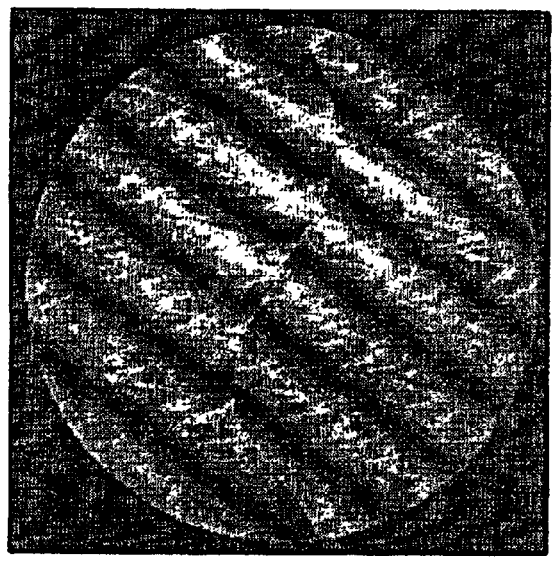
FIG. 11 is a view showing how to provide a virtual fringe to the modulation mask region of the interference fringe image in the third example.
Figure 12:
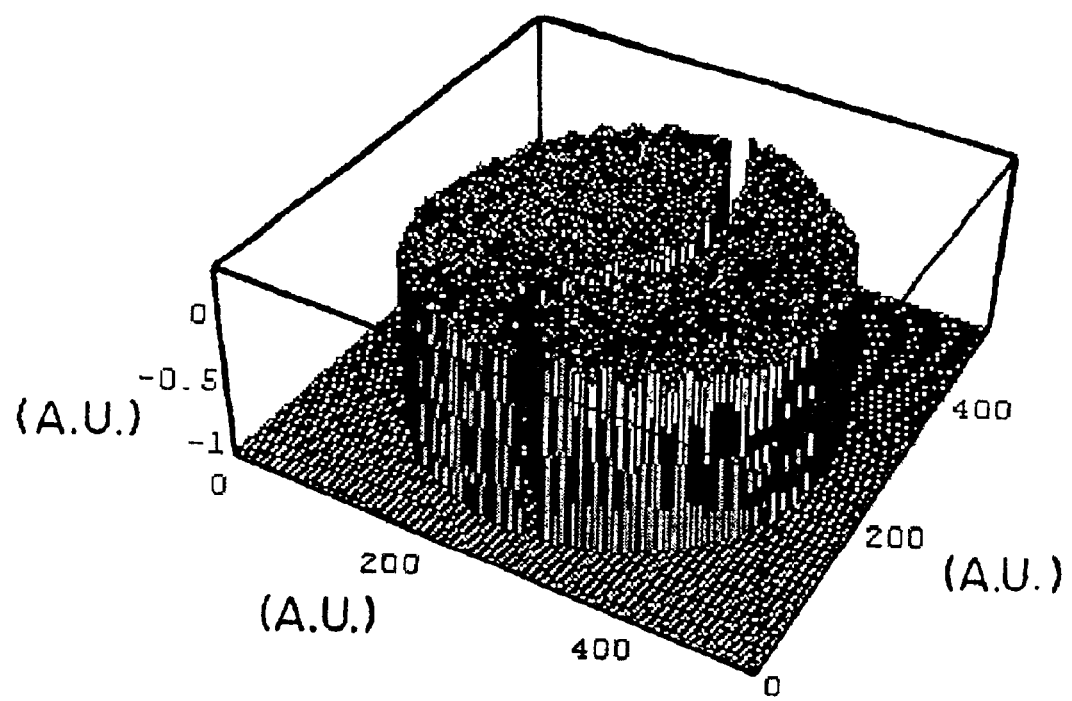
FIG. 12 is a view showing results obtained when the modulation mask region is deleted after the fringe image in the state of FIG. 11 is analyzed over the whole surface in the third example.

FIG. 9 is a flowchart showing a third example of the present invention, which is an example of a case where a mask (hereinafter referred to as modulation mask) is determined by use of a threshold according to a modulation of a fringe image, and this modulation mask is used. In this example, since the contrast of a picture is not always unfavorable, a modulation mask such as the one shown in FIG. 10 can be determined even when no blurred image processing is carried out (S21 to S23). Subsequently, the fringe image is binary-coded (S24), a mask start line is determined (S25) as in the first example, the brightness of the fringe image at the start line of the modulation mask is recorded (S26), and a virtual fringe image having a brightness on a par with that at the start line is provided to the modulation mask region (S27). The results are shown in FIG. 11. Thereafter, the whole surface of the fringe image provided with the virtual fringe is analyzed (S28), and the virtual fringe form provided to the mask region is deleted (S29). The results are shown in FIG. 12.

Figure 13:
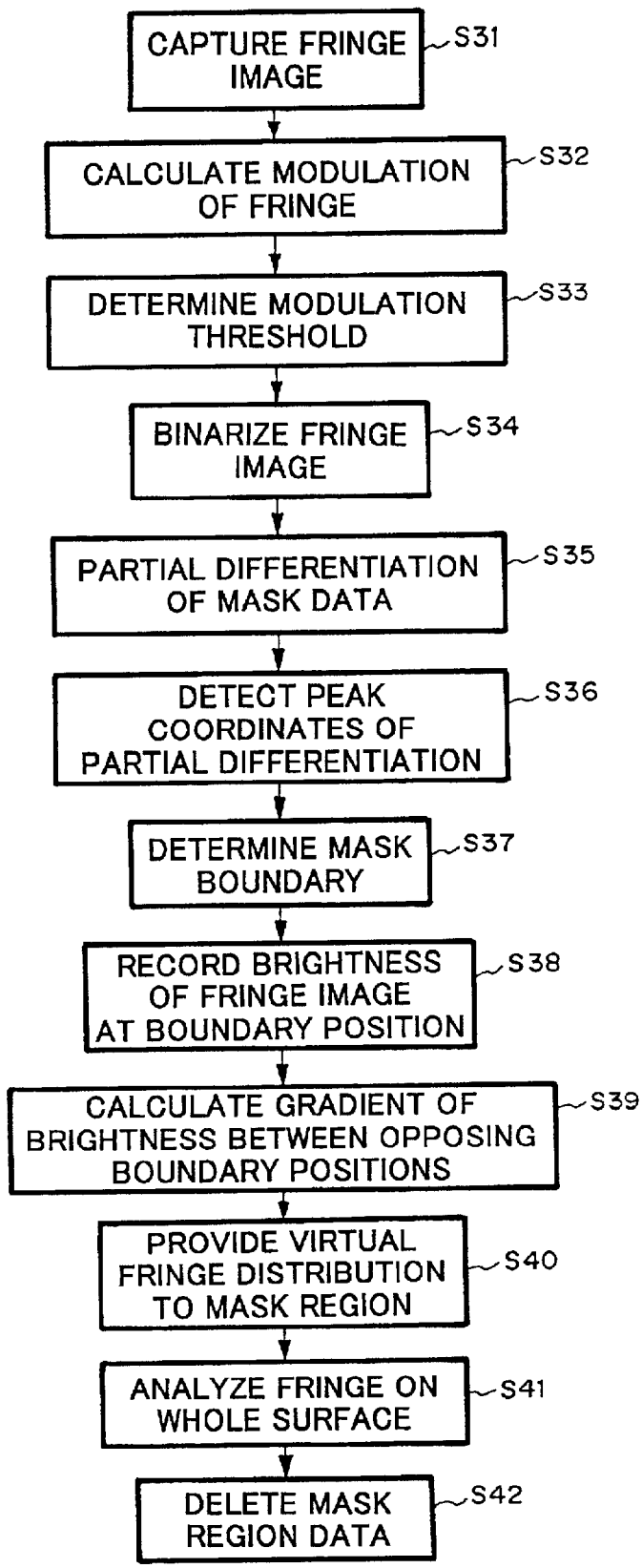
FIG. 13 is a flowchart showing the fringe image analyzing method in accordance with a fourth example of the present invention.
Figure 14:
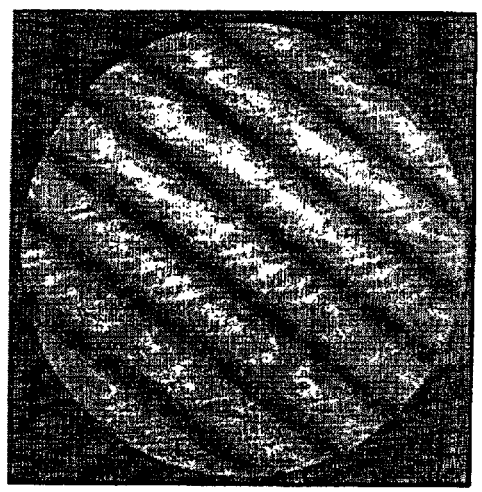
FIG. 14 is a view showing how to provide a virtual fringe to a mask region of an interference fringe image in the fourth example.
Figure 15:
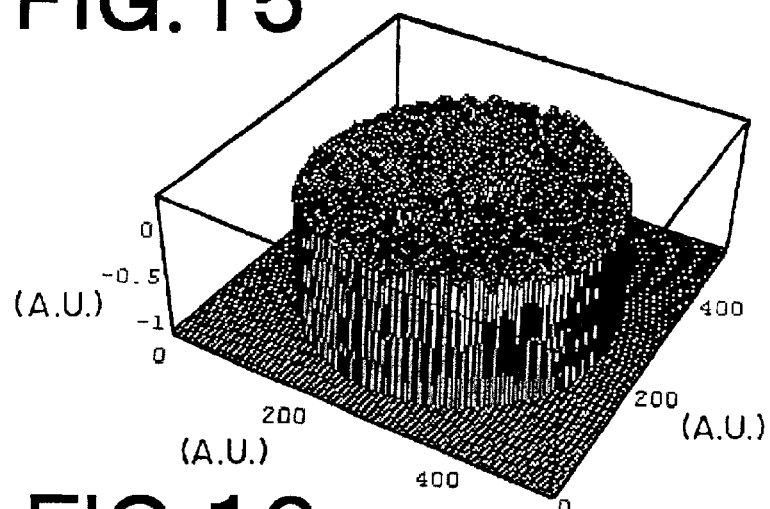
FIG. 15 is a view showing results obtained when the fringe provided with the virtual fringe is totally analyzed in the fourth example.
Figure 16:
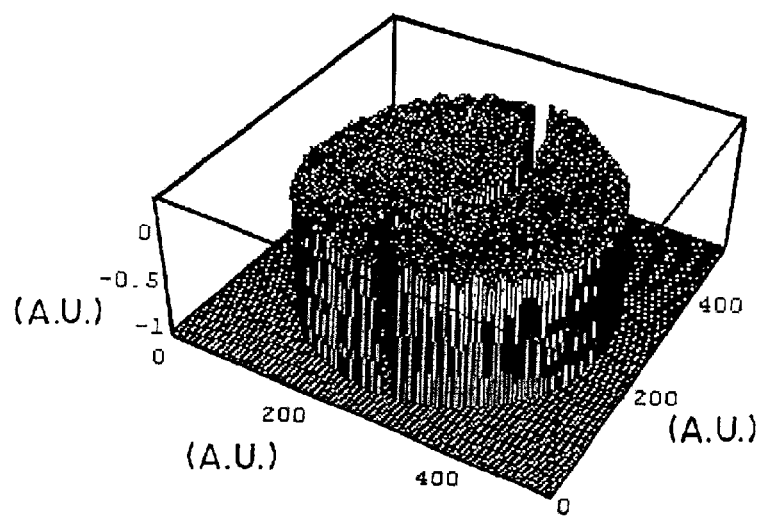
FIG. 16 is a view showing results obtained when the mask region is deleted from the results shown in FIG. 15.

FIG. 13 is a flowchart showing a fourth example of the present invention. The fourth example is also an example of measurement of a light-reflecting object having a gap at the center part thereof by use of an interference fringe, in which a modulation mask is formed as in the third example. Here, steps 31 to 34 (S31 to S34) correspond to steps 21 to 24 (S21 to S24) in the third example. Thereafter, data of the modulation mask is subjected to partial differentiation (S35), peak coordinates of partial differentiation are detected from the results of partial differentiation of the mask data (S36), and a mask boundary is determined from thus detected value (S37). Subsequently, the brightness of the fringe image at a boundary position of the mask is recorded (S38), and the gradient concerning brightness between opposing boundary positions is calculated (S39). Using thus calculated gradient concerning brightness, a virtual fringe is provided to the mask region (S40). The results are shown in FIG. 14. Thereafter, the whole surface of the fringe image provided with the virtual fringe is analyzed (S41). The results are shown in FIG. 15. Then, the virtual fringe form provided to the mask region is deleted (S42). The results are shown in FIG. 16.

When such a bright distribution that the brightness between two opposing boundary positions changes with a gradient is provided between the boundary positions, a mutual relationship can be imparted to a plurality of independent inspection regions.

Figure 17:
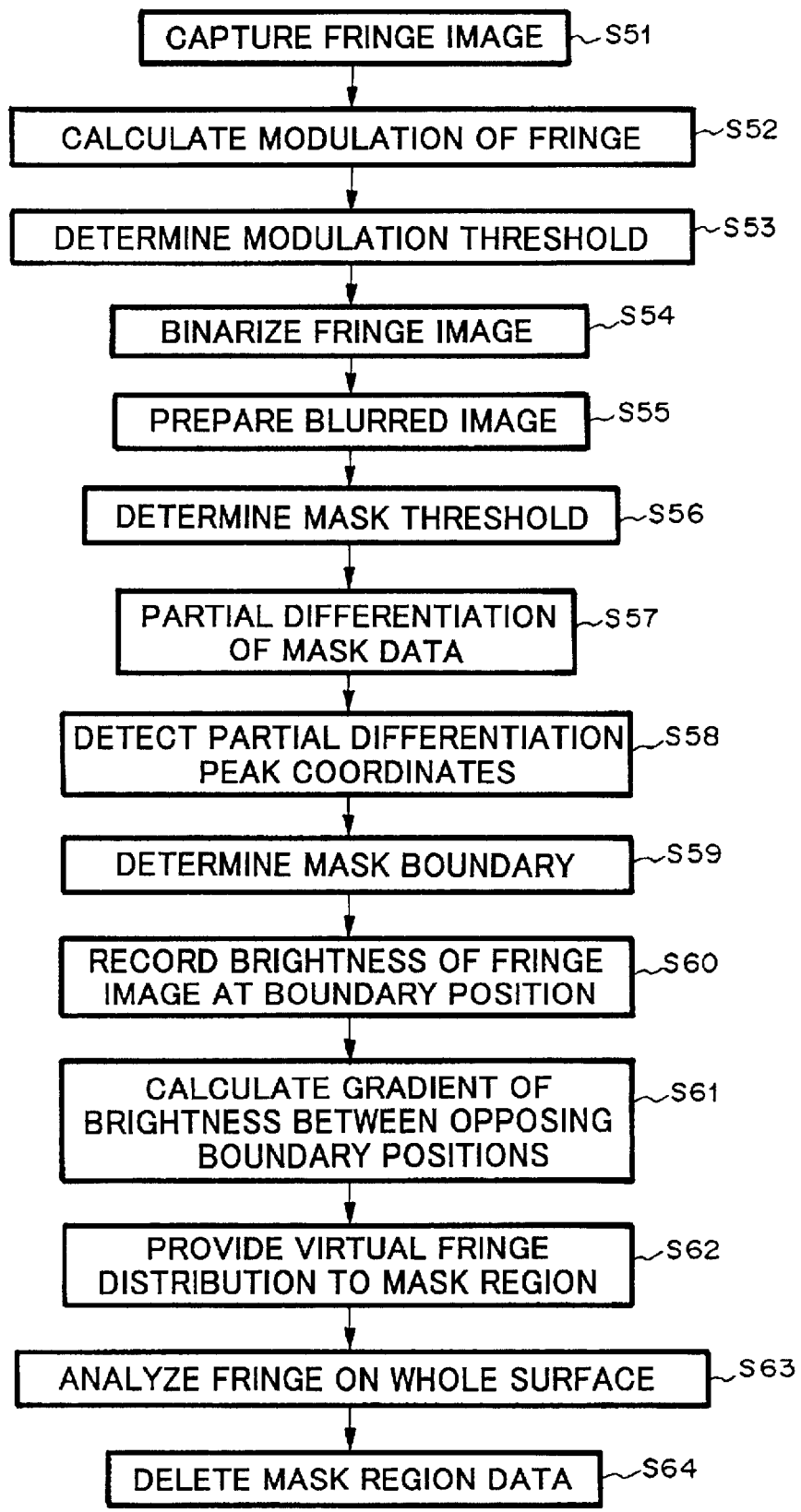
FIG. 17 is a flowchart showing the fringe image analyzing method in accordance with a fifth example of the present invention.
Figure 18:
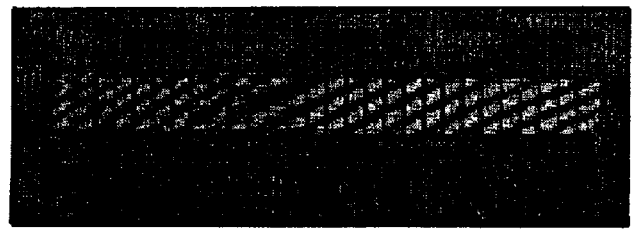
FIG. 18 is a view showing an interference fringe image obtained in the fifth example.
Figure 19:
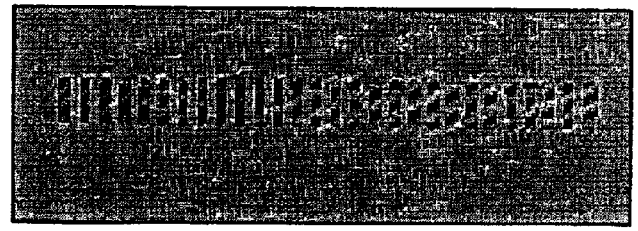
FIG. 19 is a view showing a mask determined in the fifth example.
Figure 20:
FIG. 20 is a view showing how to provide a virtual fringe to the mask region of the interference fringe image in the fifth example.
Figure 21:
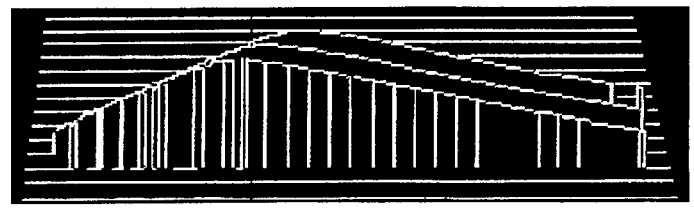
FIG. 21 is a view showing results obtained when the mask region is deleted from the results shown in FIG. 20.

FIG. 17 is a flowchart showing a fifth example of the present invention. In the fifth example, an interference fringe image of a light-reflecting member having a slit per predetermined pitch, as shown in FIG. 18, obtained by use of an interferometer is initially stored into a memory (S51), a modulation of this fringe is calculated (S52), a threshold is set in the modulation of the fringe image (S53), the fringe image is binary-coded according to the threshold (S54), a blurred image is prepared by averaging each pixel of the binary-coded image with a pixel in the vicinity thereof (S55), and then a mask is determined by setting a mask threshold with the brightness of the blurred image (S56). Thus determined mask is shown in FIG. 19. A partial differentiation process is carried out with respect to the brightness of each point while the whole surface of mask data obtained by binary-coding with the mask threshold is scanned over the whole surface in a main scanning direction and a direction orthogonal thereto (S57), thereby yielding partial differentiation peak coordinates (S58), from which a boundary of the mask is determined (S59). Subsequently, the brightness of the fringe image at a boundary position of the mask is recorded (S60), the gradient of brightness between individual boundary positions is determined according to thus recorded brightness (S61), and a virtual fringe is provided to the mask region by using the gradient concerning brightness (S62). The fringe image provided with the virtual fringe is shown in FIG. 20. Further, the whole surface of a single fringe image region provided with the virtual fringe is analyzed (S63), and then the information of the mask region is deleted from the information of the single fringe image region obtained by the whole surface analysis (S64). Thus obtained information is shown in FIG. 21.

When a mask threshold is set with the brightness of a blurred image, a smooth mask can automatically be prepared in the region for providing the virtual distribution even when the region has a complicated form or a part having an unfavorable image contrast.

Figure 22:
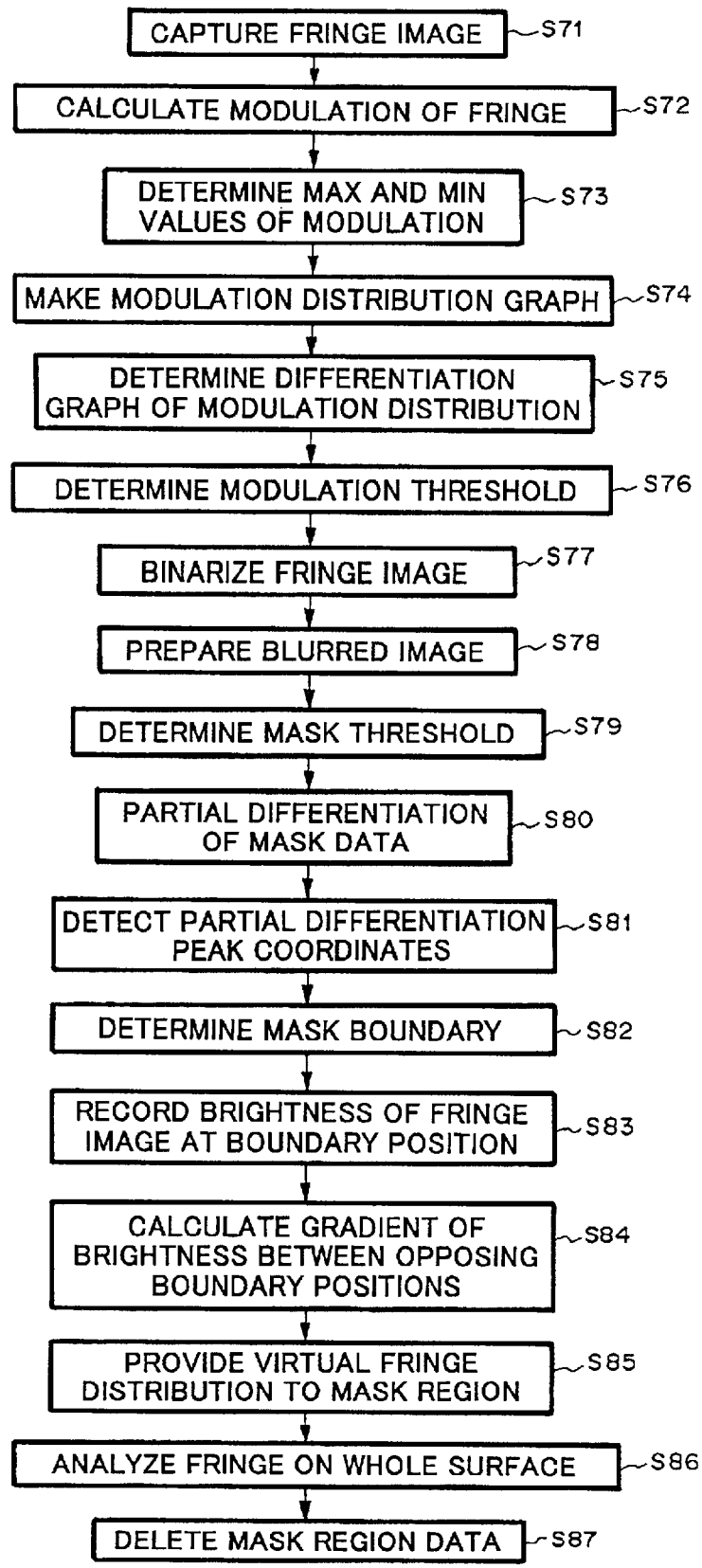
FIG. 22 is a flowchart showing the fringe image analyzing method in accordance with a sixth example of the present invention.
Figure 23:
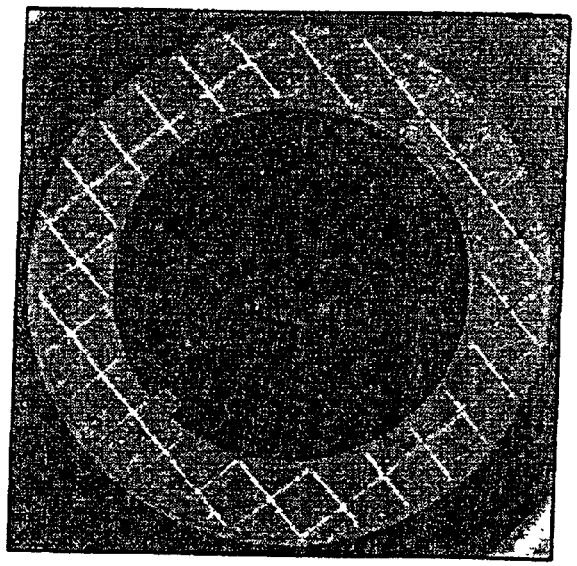
FIG. 23 is a view for explaining a moiré fringe image obtained in the sixth example.
Figure 24:
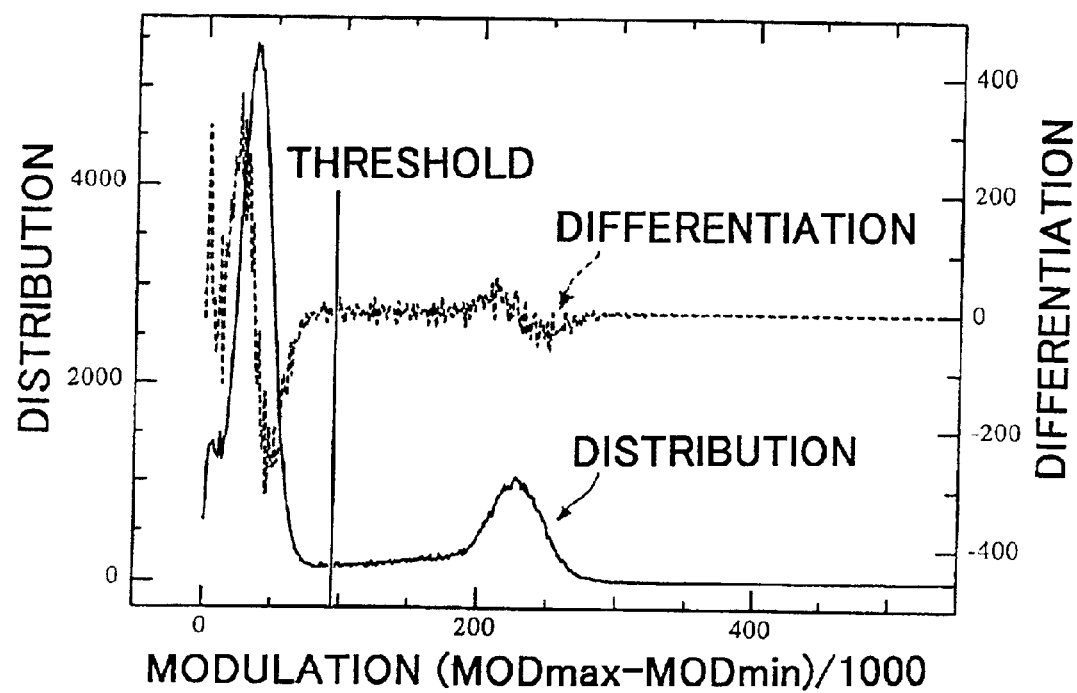
FIG. 24 is a graph showing a moiré fringe image modulation distribution graph and a differentiation graph thereof in the sixth example.
Figure 25:
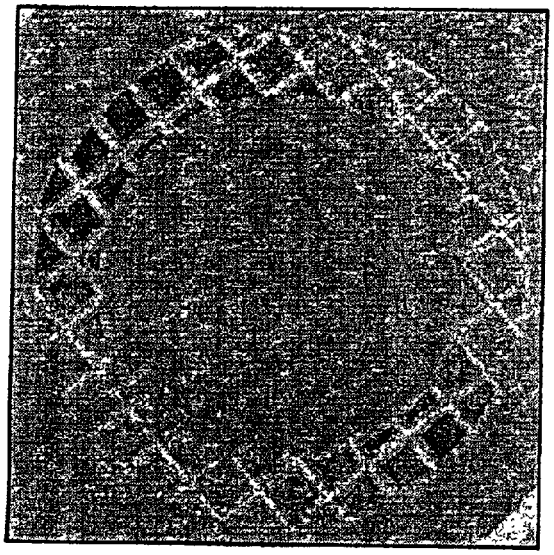
FIG. 25 is a view showing a mask determined in the sixth example.
Figure 26:
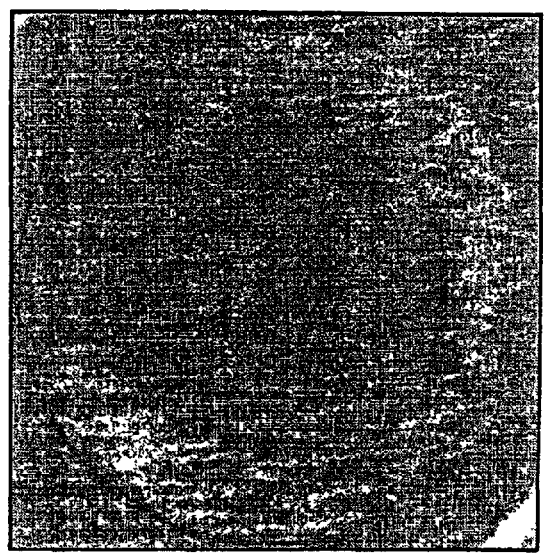
FIG. 26 is a view showing how to provide a virtual fringe to the mask region of the interference fringe image in the sixth example.
Figure 27:
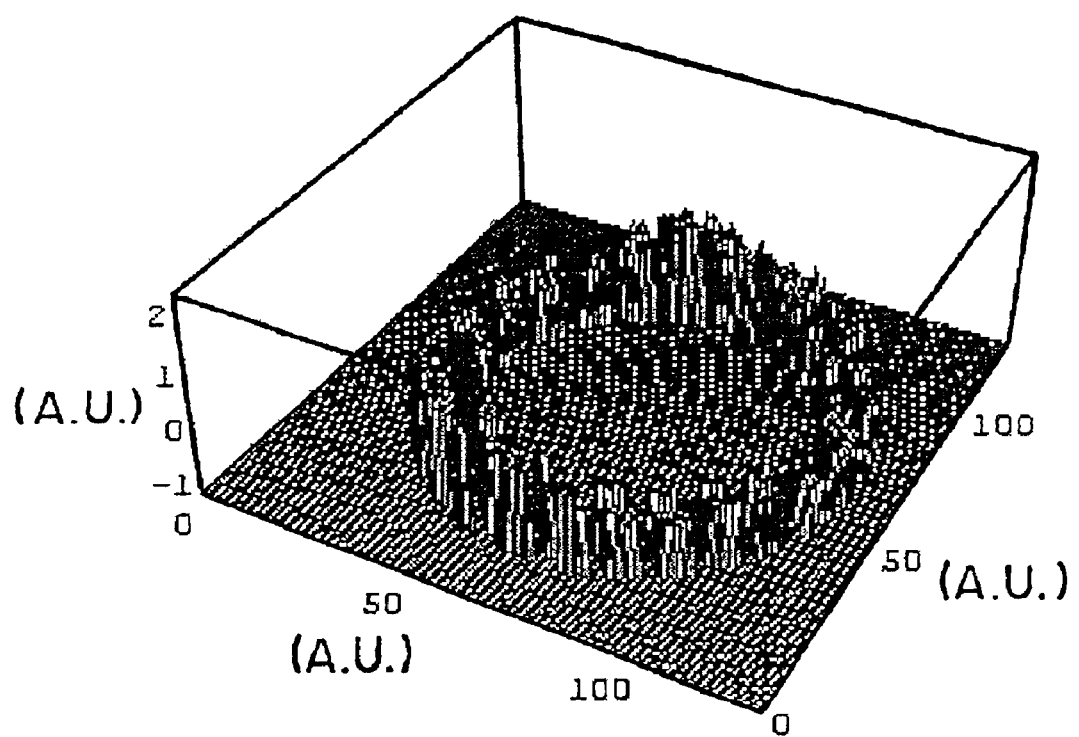
FIG. 27 is a view showing results obtained when the mask region is deleted from the results shown in FIG. 26.

FIG. 22 is a flowchart showing a sixth example of the present invention, which is an example of analyzing moiré fringes of a clutch plate having a grating-like slit by use of a flatness meter. First, a moiré fringe image obtained by use of the flatness meter is stored into a memory (S71). Subsequently, maximum and minimum values of a modulation are determined with respect to the whole of the fringe image, which is shown in FIG. 23 (S72, S73), and as shown in FIG. 24, a modulation distribution graph (S74) of the image and its differentiation graph (S75) are prepared according to the difference between the maximum and minimum values of the modulation. According to the modulation distribution graph of the fringe image and its differentiation graph, a modulation threshold is determined (S76). After the fringe image is binary-coded according to the threshold of the modulation (S77), each pixel of the binary-coded image is averaged with a pixel in the vicinity thereof, so as to prepare a blurred image (S78). Then, a mask threshold is set with respect to the brightness of each position of the blurred image, so as to determine a mask (S79). Thus determined mask is shown in FIG. 25. Thereafter, a partial differentiation process is carried out with respect to the brightness of each point while the mask data obtained by binary-coding is scanned in a main scanning direction and a direction orthogonal to the main scanning direction over the whole surface (S80), thereby yielding peak coordinates of the partial differentiation (S81), from which a boundary of the mask is determined (S82). Then, the brightness of the fringe image at a boundary position of the mask is recorded (S83), the gradient of brightness between individual boundary positions is determined according to the recorded brightness (S84), and a virtual fringe is provided to the mask region by using the gradient concerning brightness (S85). The fringe image provided with the virtual fringe is shown in FIG. 26. Further, a single fringe image region provided with the virtual fringe is analyzed over the whole surface (S86), and then the information of the mask region is deleted from the information of the single fringe image region obtained by the whole surface analysis (S87). Thus obtained information is shown in FIG. 27.

In this manner, a modulation threshold of the fringe image can be obtained from a modulation distribution and its change ratio distribution, whereby the threshold can automatically be determined.

The method of analyzing a fringe image having separate regions is not limited to that of the above-mentioned embodiment, but can be modified in various manners. For example, each of the above-mentioned examples can similarly be applied to various fringe images without being restricted to interference fringes, moiré fringes, and the like.

In the case where a fringe image analysis for analyzing a fringe image so as to obtain information of a specimen is carried out by the method of analyzing a fringe image having separate regions in accordance with the present invention, even when the fringe image is constituted by an assembly of a plurality of independent fringe image regions separated from each other by a region such as a groove forming no interference fringe, a mask is provided in a gap separating the plurality of fringe image regions from each other, a virtual fringe distribution is provided to the mask region so as to yield a single fringe image, a fringe analysis is carried out thereafter, and then the data of the mask region is deleted, whereby the separated independent regions are provided with a phase relationship as explained in the foregoing. Therefore, the problem of start point for connecting phases does not occur at the time of connecting the respective phases of independent regions to each other. Also, since complicated calculations are not required, information of an object to be observed can be obtained at a high speed.

What is claimed is:

1. A method of analyzing a fringe image having separate regions, in which a fringe image carrying information of an object to be observed is analyzed so as to obtain said information of said object, said fringe image being constituted as an assembly of a plurality of separate independent fringe image regions, said method comprising the steps of:
   providing a mask to a gap separating said plurality of fringe image regions from each other;
   rendering a virtual fringe distribution to thus obtained mask region so as to yield a single continuous fringe image region;
   analyzing the whole surface of thus obtained single fringe image region by use of a predetermined fringe analysis method; and deleting information of said mask region from information of said single fringe image region obtained by said whole surface analysis, so as to yield desirable information of said fringe image.

2. A method of analyzing a fringe image having separate regions according to claim 1, wherein said mask corresponding to a gap for separating said plurality of fringe image regions from each other is formed by rendering a threshold to a modulation of said fringe image captured by imaging means, binary-coding said fringe image according to said threshold, preparing a blurred image by averaging each pixel of said binary-coded image and a pixel in the vicinity thereof, and setting a mask threshold thereafter according to a brightness of said blurred image.

3. A method of analyzing a fringe image having separate regions according to claim 2, wherein processing of said blurred image is omitted when said fringe image has a favorable contrast.

4. A method of analyzing a fringe image having separate regions according to claim 2, wherein processing for providing said mask is manually carried out while observing said fringe image.

5. A method of analyzing a fringe image having separate regions according to claim 1, wherein said fringe image is a fringe image obtained by a lightwave interferometer.

6. A method of analyzing a fringe image having separate regions according to claim 1, wherein said fringe image is a fringe image obtained by a moiré profilometer.

7. A method of analyzing a fringe image having separate regions according to claim 1, wherein said object to be observed is a measurement member having a slit per predetermined pitch.

8. A method of analyzing a fringe image having separate regions according to claim 1, wherein said threshold in modulation of said fringe image is set by a distribution graph of modulation prepared according to maximum and minimum values of said modulation of fringe image determined over the whole surface of means for displaying said fringe image, and a modulation value yielding the lowest modulation distribution while being located in the vicinity of zero in a differentiation graph determining a change ratio in said distribution graph of modulation.

9. A method of analyzing a fringe image having separate regions according to claim 1, wherein a boundary position of said mask provided so as to correspond to said gap for separating said plurality of image regions from each other is determined by binary-coding said blurred image with said mask threshold, and then carrying out partial differentiation of a brightness of each point while scanning the whole surface of means for displaying thus binary-coded image in a scanning direction and/or a direction orthogonal to said scanning direction, so as to determine a point of change in brightness.

10. A method of analyzing a fringe image having separate regions according to claim 1, wherein said virtual fringe distribution is rendered to said gap for separating said plurality of fringe image regions from each other by providing said mask to said fringe image and determining a brightness of said fringe image at a boundary position of said mask and another boundary position opposite thereto in a scanning direction over the whole surface, determining a gradient of brightness between each pair of boundary positions from thus determined brightness, and providing a brightness having said gradient distribution between boundary positions corresponding to each pair of said masked boundary positions for complement.

* * * * *